(12) United States Patent
Sheri et al.

(10) Patent No.: US 10,735,462 B2
(45) Date of Patent: Aug. 4, 2020

(54) COMPUTER MALWARE DETECTION

(71) Applicant: Kaminario Technologies Ltd., Yokne'am ILIT OT (IL)

(72) Inventors: Ran Sheri, Rishon LeTsiyon (IL); Yogev Vaknin, Pardes-Hana Karkur (IL)

(73) Assignee: Kaminario Technologies Ltd., Yokne'am Illit (IL)

( * ) Notice: Subject to any disclaimer, the term of this patent is extended or adjusted under 35 U.S.C. 154(b) by 475 days.

(21) Appl. No.: 15/366,315

(22) Filed: Dec. 1, 2016

(65) Prior Publication Data

US 2018/0159866 A1  Jun. 7, 2018

(51) Int. Cl.
| | |
|---|---|
| *H04L 29/06* | (2006.01) |
| *G06F 21/56* | (2013.01) |
| *G06F 21/64* | (2013.01) |

(52) U.S. Cl.
CPC ........ *H04L 63/1466* (2013.01); *G06F 21/566* (2013.01); *G06F 21/64* (2013.01)

(58) Field of Classification Search
CPC ............. H04L 63/1408; H04L 63/061; G06F 21/6218
See application file for complete search history.

(56) References Cited

U.S. PATENT DOCUMENTS

| | | | | |
|---|---|---|---|---|
| 10,140,303 | B1* | 11/2018 | Patterson | ............... G06F 16/164 |
| 2004/0230724 | A1* | 11/2004 | Stager | ................... G06F 3/0605 |
| | | | | 710/68 |
| 2007/0006300 | A1* | 1/2007 | Zamir | ................... G06F 21/563 |
| | | | | 726/22 |
| 2007/0240217 | A1* | 10/2007 | Tuvell | ..................... G06F 21/56 |
| | | | | 726/24 |
| 2009/0210943 | A1* | 8/2009 | Alon | ...................... G06F 21/563 |
| | | | | 726/24 |
| 2009/0300761 | A1* | 12/2009 | Park | ...................... G06F 21/562 |
| | | | | 726/23 |
| 2015/0052605 | A1* | 2/2015 | Yu | ........................... G06F 21/56 |
| | | | | 726/23 |
| 2015/0178013 | A1* | 6/2015 | Rostoker | ............... G06F 3/0608 |
| | | | | 711/115 |
| 2016/0212160 | A1* | 7/2016 | Jiang | ................... H04L 63/1416 |
| 2016/0364401 | A1* | 12/2016 | Amit | ......................... G06F 3/06 |
| 2017/0185313 | A1* | 6/2017 | Golden | ................. G06F 3/0608 |

OTHER PUBLICATIONS

Jared Lee, "Compression-based analysis of Metamorphic Malware," Fall 2003, pp. 1-57, Dec. 2013. (Year: 2013).*

Abeer M. Mahmoud et al., "A Comparative Study of Meta-Heuristic Algorithm for Solving Quadratic Assignment Problem" pp. 1-202, 2014. (Year: 2014).*

* cited by examiner

*Primary Examiner* — Luu T Pham
*Assistant Examiner* — Canh Le
(74) *Attorney, Agent, or Firm* — Wiggin and Dana LLP; Gregory S. Rosenblatt; Rikesh P. Patel (57) ABSTRACT

According to the presently disclosed subject matter, malware induced data compression is harnessed for detecting infection of a host computer by the malicious software, which caused data compression. To this end, compressed ratio of the compressed data received from a host computer is compared with an expected compression ratio and based on the comparison it is determined whether the received data is suspected of being infected by a malware.

18 Claims, 6 Drawing Sheets

COMPUTER MALWARE DETECTION

FIELD OF THE PRESENTLY DISCLOSED SUBJECT MATTER

The presently disclosed subject matter is related to data compression management and cyber security.

BACKGROUND

An increasingly common computer malware, also known as "ransomware", operates by encrypting files on an infected computer making the files inaccessible to users. In many cases this type of attack is used for forcing the user to pay a ransom money in order to get a decryption key for decrypting the locked files.

GENERAL DESCRIPTION

According to one aspect of the presently disclosed subject matter there is provided a computer system comprising: a control unit operatively connected to at least one host computer device comprising a respective computer data-storage device; the control unit is configured to detect malicious software on the at least one host computer device, wherein the malicious software, when being executed operates to encrypt data stored on the respective computer data-storage device; the control unit is configured for detecting the malicious software to:

compress data received from a host computer device to obtain compressed data;

determine compression ratio value between data as originally received from the host computer device and the compressed data; and generate a malware infection notification in case the difference between an expected compression ratio value of the host computer device and the compression ratio value is greater than a certain threshold value.

In addition to the above features, the system according to this aspect of the presently disclosed subject matter can optionally comprise one or more of features (i) to (ix) below, in any technically possible combination or permutation.

i. The computer system comprises one or more data-storage devices, the data-storage devices constituting a physical storage space; the control unit is configured to store data received from the at least one computer host device in the physical storage space; wherein the control unit is configured, in the event a malware infection notification is issued, to avoid storing data received from the host computer device in the physical storage space.

ii. The computer system is configured to execute a learning process for determining the expected compression ratio value, comprising:

for each one of multiple write commands received from a certain host computer device:

compress data received in the write command to obtain compressed data; determine a compression ratio value to thereby obtain a plurality of compression ratio values;

calculate an expected compression ratio value based on the plurality of compression ratio values.

iii. The computer system is further configured, responsive to malware infection notification, to execute a malware infection warning.

iv. wherein the malware infection warning is transmitted to the host computer device.

v. wherein the warning includes a graphical indication displayed on a computer display of the computer system and/or the host computer device.

vi. The computer system is further configured, responsive to malware infection notification, to execute a protective operation for protecting part or all of the data stored on the physical computer storage space.

vii. wherein the protective operation includes generating instructions to stop further data transfer from the host computer storage device.

viii. wherein the protective operation includes generating instructions to execute a backup snapshot of part or all of the physical storage space.

ix. wherein the protective operation includes generating instructions to override a scheduled delete operation on a previous snapshot backing up data stored in the physical storage space.

According to another aspect of the presently disclosed subject matter there is provided computer-implemented method of detecting malicious software, wherein the malicious software, when being executed operates to encrypt data stored on a computer data-storage device; the computer is further connected to at least one host computer device; the method comprising:

compressing data received from a host computer device to obtain compressed data;

determining compression ratio value between data as originally received from the host computer device and the compressed data; and executing a malware infection notification in case the difference between an expected compression ratio value of the host computer device and the compression ratio value is greater than a certain threshold value.

According to another aspect of the presently disclosed subject matter there is provided a non-transitory program storage device readable by a computer, tangibly embodying a computer readable instructions executable by the computer to perform a method of detecting malicious software, wherein the malicious software, when being executed operates to encrypt data stored on a computer data-storage device; the computer is connected to at least one host computer device; the method comprising:

compressing data received from a host computer device to obtain compressed data;

determining compression ratio value between data as originally received from the host computer device and the compressed data; and execute a malware infection notification in case the difference between an expected compression ratio value of the host computer device and the compression ratio value is greater than a certain threshold value.

The presently disclosed subject matter further contemplates a control device configured to operate in data-storage system, the control device is operatively connected to at least one host computer device comprising a respective computer data-storage device; the control device is configured to detect malicious software on the at least one host computer device, wherein the malicious software, when being executed operates to encrypt data stored on a computer data-storage device; the control device is configured for detecting the malicious software to:

compress data received from a host computer device to obtain compressed data; determine compression ratio value between data as originally received from the host computer device and the compressed data; and execute a malware infection notification in case the difference between an expected compression ratio value of the host computer device and the compression ratio value is greater than a certain threshold value.

The presently disclosed subject matter further contemplates a data-storage system comprising: a control unit operatively connected to one or more data-storage devices, the data-storage devices constituting a physical storage space; the control unit is further connected to at least one host computer device comprising a respective computer data-storage device; the control unit is configured to store data received from the at least one computer host device in the physical storage space;

the control unit is configured to detect malicious software on the at least one host computer device, wherein the malicious software, when being executed operates to encrypt data stored on a computer data-storage device; the control unit is configured for detecting the malicious software to:

compress data received from a host computer device to obtain compressed data;

determine compression ratio value between data as originally received from the host computer device and the compressed data; and execute a malware infection notification in case the difference between an expected compression ratio value of the host computer device and the compression ratio value is greater than a certain threshold value.

The computer-implemented method, the non-transitory program storage device, the control device and the data-storage system disclosed herein according to various aspects can optionally further comprise one or more of features (i) to (ix) listed above, mutatis mutandis, in any technically possible combination or permutation.

The presently disclosed subject matter further contemplates a computer system, a computer-implemented method, a control unit, and a non-transitory program storage device readable by a computer, all configured for identifying data encryption failure by a host computer device, by:

compressing data received from a host computer device to obtain compressed data;

determining compression ratio value between data as originally received from the host computer device and the compressed data; and executing an encryption failure notification in case the difference between the compression ratio value and an expected compression ratio value of the host computer device is greater than a certain threshold value.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Elements in the drawings are not necessarily drawn to scale. Unless specifically stated otherwise, as apparent from the following discussions, it is appreciated that throughout the specification discussions utilizing terms such as "compressing", "determining", "executing", "calculating", "generating" or the like, include actions and/or processes of a computer that manipulate and/or transform data into other data, said data represented as physical quantities, e.g. such as electronic quantities, and/or said data representing the physical objects.

The terms "computer device", as disclosed with reference to FIG. 1, "control unit" (205), as disclosed with reference to FIG. 2 (e.g. in interface layer 210 described below) and "control device", are used herein to include any kind of electronic device with data processing circuitry, including, by way of non-limiting example, a computer processor (e.g. digital signal processor (DSP), a microcontroller, a field programmable gate array (FPGA), an application specific integrated circuit (ASIC), etc.), or any device comprising a processor and computer memory such as a personal computer, a server computer, a computing system, a communication device, or any other electronic computing device, and or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 4:
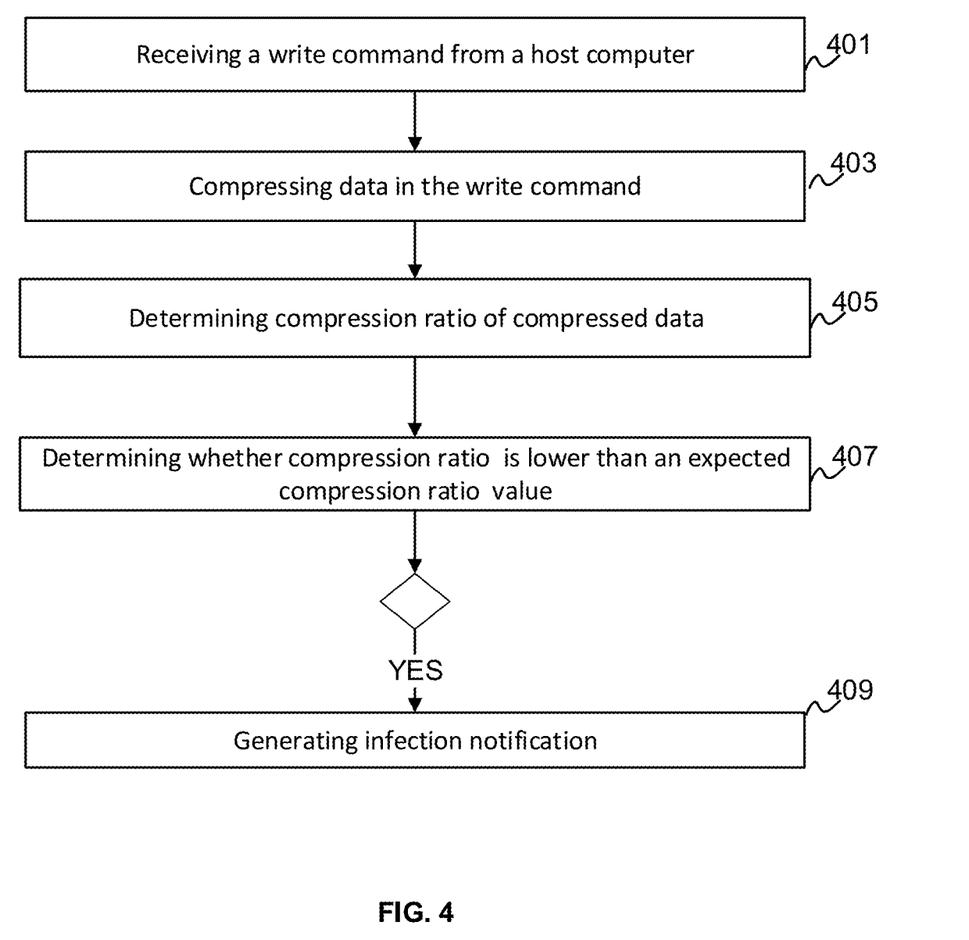
FIG. 4 is a flowchart showing a sequence of operations performed for detection of malware, according to an example of the presently disclosed subject matter.
Figure 5:
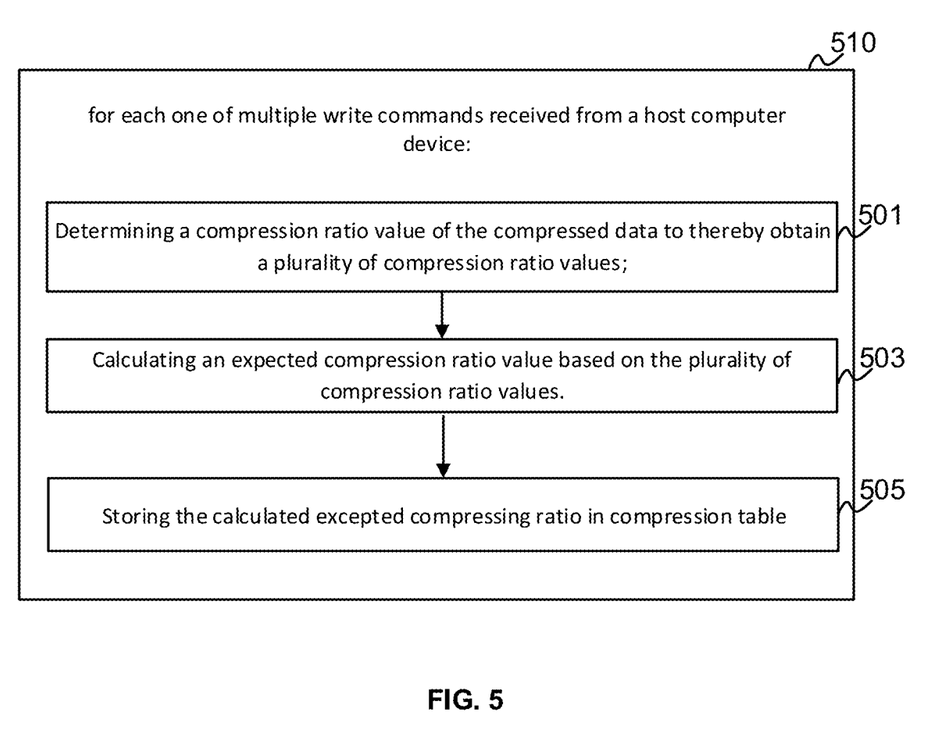
FIG. 5 is a flowchart showing a sequence of operations of a learning process, according to an example of the presently disclosed subject matter.
Figure 6:
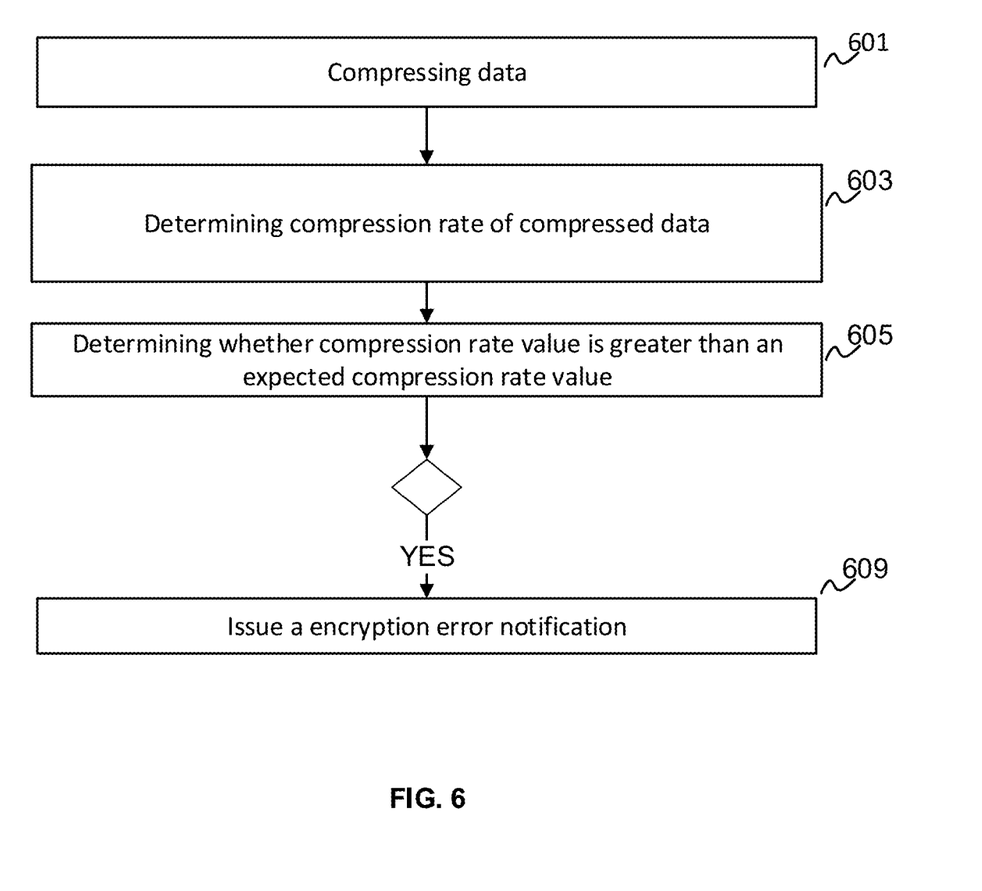
FIG. 6 is a flowchart showing a sequence of operations performed for detection of encryption failure, according to an example of the presently disclosed subject matter.

In embodiments of the presently disclosed subject matter, fewer, more and/or different stages than those shown in any one of FIG. 4 to FIG. 6 may be executed. In embodiments of the presently disclosed subject matter, one or more stages illustrated in FIG. 4 to FIG. 6 may be executed in a different order and/or one or more groups of stages may be executed simultaneously.

Figure 1:
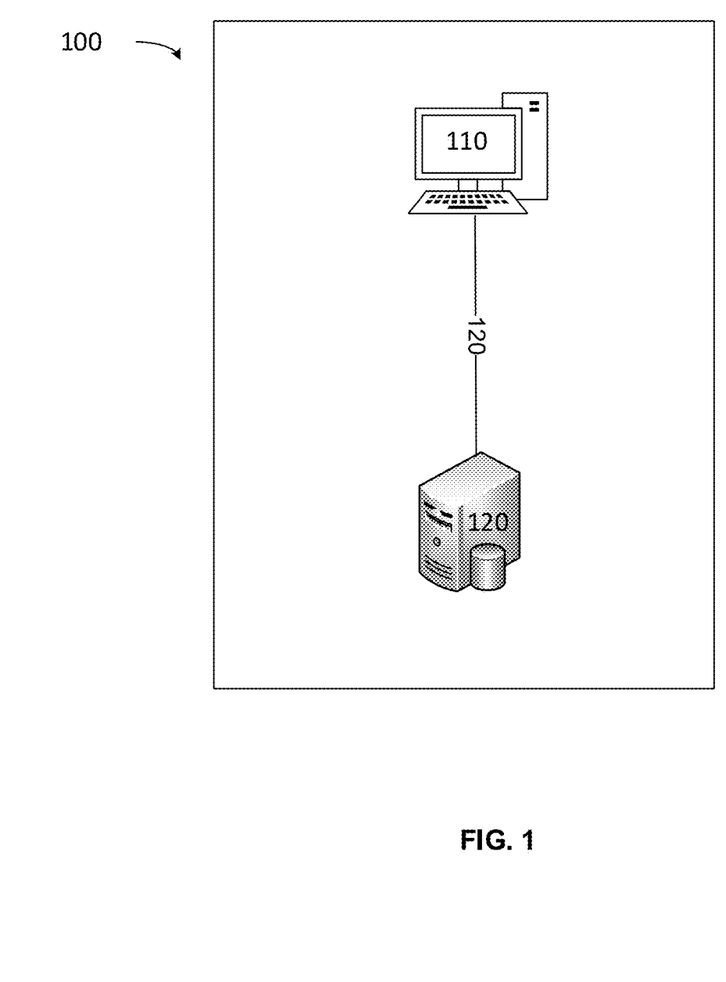
FIG. 1 is a schematic illustration showing a computer system, according to an example of the presently disclosed subject matter.
Figure 2:
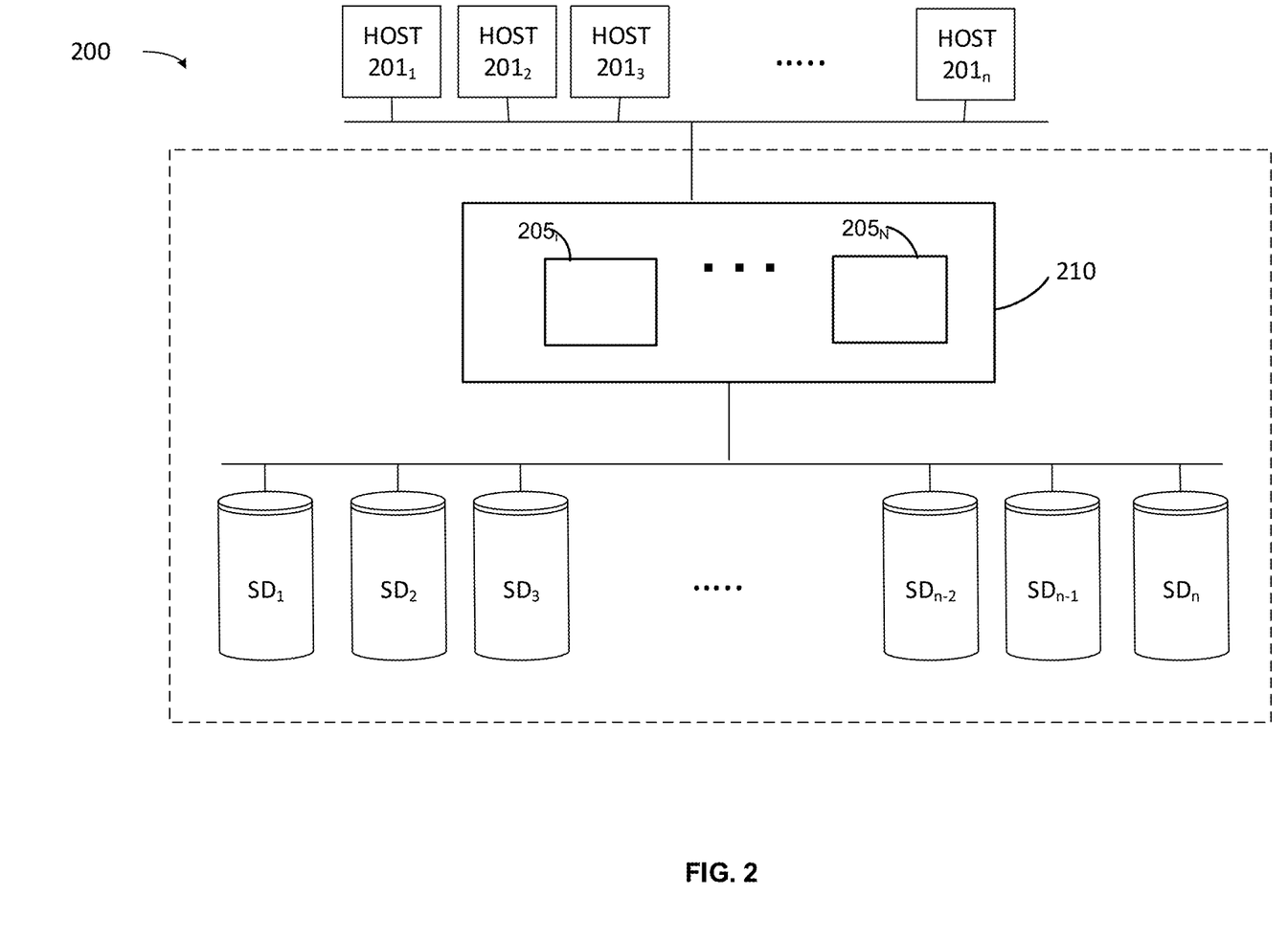
FIG. 2 is a functional block diagram of a storage system, according to an example of the presently disclosed subject matter.
Figure 3:
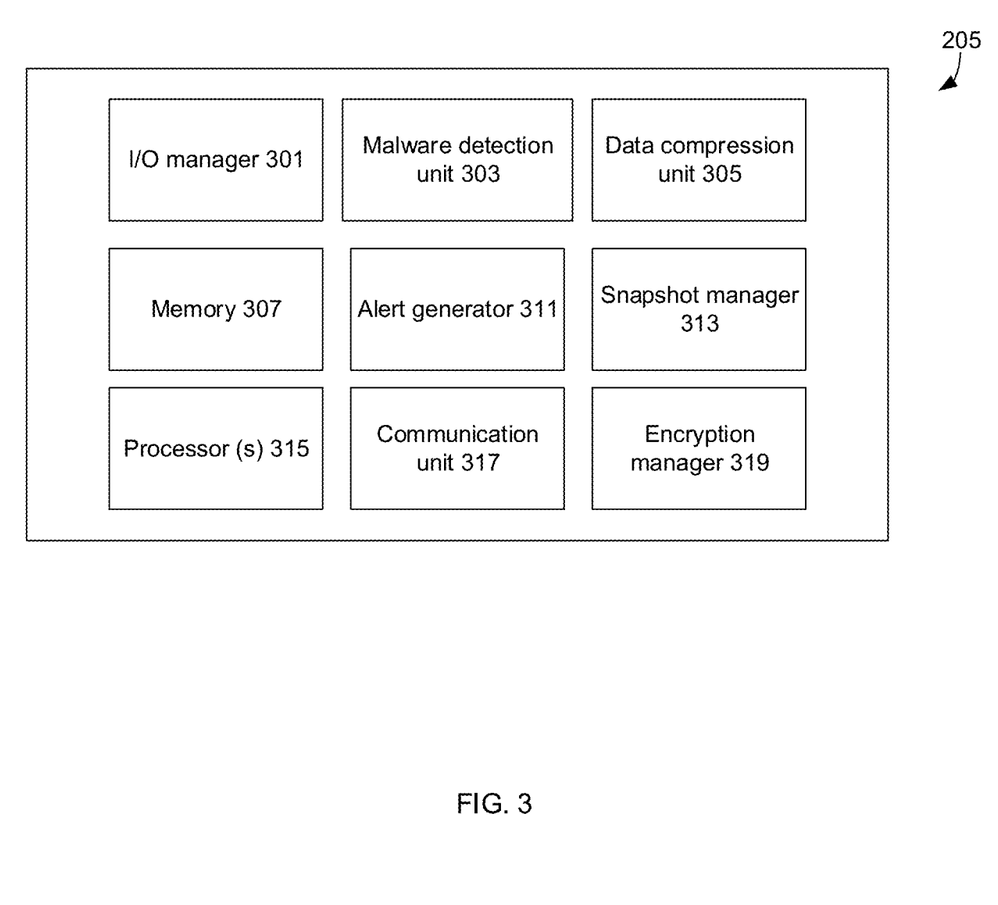
FIG. 3 is a functional block diagram of a control unit, according to an example of the presently disclosed subject matter.

FIG. 1 to FIG. 3 illustrate the system architecture in accordance with various embodiments of the presently disclosed subject matter. Functional elements in FIG. 1 to FIG. 3 can be made up of a combination of software and hardware and/or firmware that performs the functions as defined and explained herein. Functional elements in FIG. 1 to FIG. 3 may be centralized in one location or dispersed over more than one location. In other embodiments of the presently disclosed subject matter, the system may comprise fewer, more, and/or different elements than those shown in FIG. 1 to FIG. 3.

Bearing the above in mind, attention is drawn to FIG. 1 showing a computer system, according to an example of the presently disclosed subject matter. Computer system 100 includes two computers communicating over a communication link (120). Computer 120 schematically represents one or more computer devices operating for storing data received from computer 110. For this purpose computer 120 comprises or is otherwise operatively connected to a data-storage device (e.g. Hard Storage devices (HDD) or Solid State Drives). Computers 120 and 110 can be any two computers connected over a communication network. According to one example computer 120 can be a data storage server configured to handle I/O instructions received from host computer device 110

For purposes of storage space efficiently, before storing the received data, computer device 120 compresses the received data, and then stores the compressed data. As explained in the background section above, some malicious software (malware) operates by encrypting files on an infected computer, making the files inaccessible to the users. A byproduct of the encryption process is the compression of the encrypted data. According to the presently disclosed subject matter, the malware induced data compression is harnessed for detecting infection of the host computer 110 by the malicious software, which caused data compression. To this end, computer device 120 is configured to compare between compressed ratio of the compressed data received from the host computer and an expected compression ratio and determine based on the comparison whether the received data is suspected of being infected by a malware. A malware infection warning can be issued to computer device 120 and/or host computer 110 in case suspected malware infection is detected.

FIG. 2 is a functional block diagram of a storage system, according to an example of the presently disclosed subject matter. Storage system 200 (e.g. a highly available data-storage system) comprises a physical storage space comprising one or more physical storage units ($SU_{1-n}$), each physical storage unit comprising one or more storage devices. Storage devices may be any one of Hard Storage devices (HDD) or Solid State Drives (SSD, comprising for example, a plurality of NAND elements), DRAM, non-volatile RAM, or any other computer storage technology or combination thereof. Physical storage units ($SU_{1-n}$) can be consolidated in a single unit, or can be otherwise distributed over one or more computer nodes connected across a computer network.

Storage system 200 can further comprise interface layer 210 comprising various control units operatively connected to the physical storage space and to one or more host ($201_{1-n}$) and configured to control and execute various operations (including I/O operations) in the storage system. Interface layer 210 can be further configured to provide a virtual storage layer logically representing the physical storage space as well as the required mapping between the physical storage space and its respective logical representation. It is noted that the term "storage unit" as used herein should be broadly construed to include any area in the physical storage space, including for example, one or more physical storage units logically combined to represent a single storage unit and/or any part of the same physical storage unit and/or parts of different physical storage units which are designated to logically represent a single storage unit.

Interface layer 210 can comprise a plurality of control units $205_{1-n}$ (e.g. each control unit implemented as a dedicated server computer device) each one assigned for managing the operation of a certain area within the physical storage space (e.g. the area comprising for example one or more designated physical storage units).

Communication between hosts ($201_{1-n}$) and interface layer 210, between interface layer 210 and storage units ($SU_{1-n}$) and between different control unit in interface layer 210 can be realized by any suitable infrastructure and protocol. According to one example, communication between various elements of storage system 200 is implemented with a combination of Fiber Channel (e.g. between hosts and interface 210), SCSI (e.g. between interface 210 and storage units) and InfiniBand (e.g. interconnecting different control units in interface 210) communication protocols.

FIG. 3 is functional block diagram of a control unit according to an examples of the presently disclosed subject matter. Control unit 205 can comprise, for example, I/O (input, output) manager 301, malware detection unit 303, and data compression unit 305. Control unit 205 also comprises one or more computer processing devices 315 for executing operations.

Notably, while FIG. 3 illustrates the components of a single control unit 205 in interface layer 210, this is done for the purpose of simplicity and clarity and the presently disclosed subject matter also contemplates an interface layer 210 configured with multiple control units ($205_1$ to $205_n$ as indicated in FIG. 2). As would be apparent to any person skilled in the art, principles described with respect to a single control unit similarly apply to two or more control units.

Control unit 205 can further comprise memory 307, including RAM and Cache memory. RAM can include transitory and non-transitory computer memory. Memory 307 can be utilized for software execution for example, by I/O manager 301 during execution of I/O commands as known in the art, and by malware detection unit 303 as described herein.

As an alternative to being incorporated as part of interface layer 210, some functional components of control unit 205 (e.g. I/O manager 301) can be implemented as a separate unit in control layer 210 or implemented on an external server or be otherwise operatively connected to the storage system for enabling management of I/O operations.

I/O manager 301 is configured to handle I/O requests received, for example from host computers $201_{1-n}$. Responsive to an I/O request, I/O manager 301 is configured to direct the request to the appropriate storage unit based on predefined rules. In general, the data received from a certain host computer device is primarily stored on a single storage device. According to some examples, in a multiple control units configuration, where different control units are connected to different storage units (or to different areas in the physical storage space, which can be physically connected, e.g. different parts of the same storage unit), a first control unit which receives an incoming I/O request, is configured to determine whether the I/O request should be forwarded to a different control unit for execution, or whether it can be executed locally by the receiving control unit, and process the command accordingly.

I/O manager 301 can comprise or be otherwise operatively connected to a data compression unit 305 configured to compress data to enable storing data received from host computer devices in compressed form. Data compression unit 305 can comprise or be otherwise operatively connected to malware detection unit 303 configured to detect suspected malware infections. More specifically, following data compression, malware detection unit 303 is configured to calculate the ratio between the data before compression as originally received from a host computer device and the compressed data. For example, assuming a 4 Kilobyte data block is compressed by data compression unit 305 and the resulting compressed data is 1 Kilobyte, the compression ratio, calculated by malware detection unit 303, can be expressed by 4/1 or 4.

FIG. 4 is a flowchart showing a sequence of operations performed for detection of malware, according to an example of the presently disclosed subject matter. Operations described with reference to FIG. 4 (as well as FIGS. 5 and 6) can be executed for example, by interface layer 210 and more specifically by control unit 205 described above. Notably, similar functional components (including, I/O manager 301, data compression unit 305 and malware detection unit 303) to those described in control unit 205 can be also implemented in computer 120 described with reference to FIG. 1 for performing the same or similar operations.

A write command, issued by a host computer device, is received at control unit 205 (block 401). The write command is directed for example to I/O manager 301 and includes data to be written to the data storage. Prior to writing the data to an appropriate storage device (SD), the data is compresses; e.g. by data compression unit 301 (block 403).

Following compression of the data, the compression ratio between the original data as originally received from the host computer device, and the compressed data is calculated; e.g. by malware detection unit 303 (block 405). The calculated compression ratio is then compared to an expected compression ratio; e.g. by malware detection unit 303 or by data compression unit 305 (block 407).

The expected compression ratio represents a typical compression ratio of a certain host computer device. The compression ratio depends, inter alia, on whether or not and to what extent, the data which is received from a host computer device has already been compressed. Some host computer devices compress the data before sending the data to system 100 while other do not (depending for example on a host computer compression policy). Data which has already been compressed by the originating host is expected to have a lower compression ratio when it is further compressed before storage by control unit 205. Compression of data is also related to the type of data. For example, video files format is usually compressed and therefore such files cannot be significantly compressed further by control unit 205. Thus, a computer host which primarily transmit to control unit 205 video filed would have an expected compression ratio lower than other hosts which primarily transmit to control unit 205 compressible filed such as text files. Thus, parameters such as the host compression policy and the file type influence the typical compression ratio of data received from a given host computer device.

The expected compression ratio of each host computer device is calculated over time. An example of a learning process for determining an expected compression ratio is described below with reference to FIG. 5. Expected compression ratio can also be some default value, or some other value which is not calculated. For example, the expected compression ratio of one host computer device can be determined based on the expected compression ratio of another host computer, when both host computers share common characteristics (e.g. belong the same enterprise, deal with the same type of content, and uses similar software and policy for I/O operations, etc.).

According to some examples control unit 205 is configured to manage (e.g. by malware detection unit 303) a compression table (e.g. stored on computer memory 307) which is used for storing a respective compression ratio values of different host computer devices. Upon receipt of a write command from a certain host computer device, the expected compression ratio of that host computer is extracted from the table.

If the difference between the expected compression ratio and the compression ratio is greater than a certain predefined threshold value a malware infection notification is generated (indicating for example a suspected malware infection warning); e.g. by malware detection unit 303 (block 409). Notably, the difference can be represented for example by the arithmetic difference or the ratio or any other mathematical relationship between the two ratio values.

According to some example, control unit 205 can be configured to execute various warnings indicating a suspected malware infections. For example, a visual warning (such as an onscreen graphical display) and/or audible warning can be generated. To his end control unit 205 can comprise an alert generator 111 configured to generate the warning and provide instructions for operating an appropriate hardware device (e.g. computer display device or amplifier device) for activating the warning. A warning can be also sent to the source host computer device (i.e. the host computer device which transmitted the infected data to the storage system) in order to notify user(s) of the source host computer device of the suspected malware infection.

In addition to the warning, control unit 205 can be configured, responsive to detection of a suspected malware infection, to execute a preventive operation. For example, control unit 205 can generate a command (e.g. to communication unit 317) instructing to terminate data reception and possibly completely disconnect from the source host computer device to avoid further contamination of the storage system by infected data.

According to another example, responsive to detection of a suspected malware infection, a snapshot of the stored files state is generated (e.g. by a snapshot manager 313 (implemented for example as a snapshot capable logical-volume manager), which enables to revert to the clean files at a later time if the malware infections continues to spread through the storage device. The snapshot can be made of the all or part of the physical storage space. For example, a snapshot of the specific storage device assigned for storing data received from the source host computer device can be generated.

According to yet another example, responsive to detection of a suspected malware infection, an instruction to override a scheduled snapshot delete command is provided to the snapshot manager 313. This command maintains in the memory previous snapshots which would help to reconstruct data currently infected by the malware and that would otherwise be deleted.

In those cases where the compression ratio of a given host computer device is lower than a certain minimal value (e.g. data received from a certain host is completely compressed) the disclosed malware detection system is not implemented. Thus, according to some examples, as a preliminary stage before the detection process is initiated, it is determined whether a received write command was initiated by a host computer device with a compression ratio which enables malware detection as disclosed herein.

To this end, the compression table can include information indicating whether or not a given host computer device is suitable for malware detection by the disclosed malware detection process. According to some examples, responsive to receiving a write command from a host computer device, malware detection unit 303 is configured to query the compression table and determine whether or not to proceed with the malware detection process based on information in the table.

FIG. 5 is a flowchart showing a sequence of operations of a learning process, according to an example of the presently disclosed subject matter. Operations described with reference to FIG. 5 can be executed for example, by data compression unit 305.

In order to determine the expected compression ratio of a given host computer device, the compression ratio of data received by that host computer device is calculated multiple times, each calculation being responsive to a write command received from the host computer device. As explained above, the received data is compressed and the compressed data is compared to the data before compression as originally received from the host computer device (block 501).

The expected compression ratio is calculated based on the plurality of compression ratio values calculated over time (block 503). For example, the expected compression ratio can be calculated as the average value of the plurality of compression ratio values. According to some examples, the expected compression ratio can be calculated based a predefined number of previously calculated compression ratio values; e.g. compression ratio values calculated over the last N days/hours or the N most recently calculated compression ratio values.

The expected compression ratio can be stored for example in the compression table and be made accessible for detection of malware infection as described above with reference to FIG. 4 (block 505).

The expected compression ratio can be continuously calculated in an ongoing process and refined as additional write commands are received and handled by the control unit and provide more information pertaining to the compression ratio values. Furthermore, changes in the compression of data received from a certain host computer device induce a change to the expected compression ratio of that host computer device. Accordingly, the malware detection capability for a given host computer device can change over time. For example, a low expected compression ratio (e.g. close to 1), which does not allow detection of malware as disclosed herein, can increase over time to a point malware detection is enabled.

FIG. 6 is a flowchart showing a sequence of operations performed for detection of encryption failure, according to an example of the presently disclosed subject matter. As explained above, encryption many time results in compression of data. It is therefore suggested herein to use data compression for determining whether data is being properly encrypted. Assuming for example, data received from a host computer is supposed to be encrypted, this technique enables to determine whether the received data is indeed encrypted.

A data compression command instructing to compress data is executed (block 601). The compression command can be issued, for example, responsive to a write command, received from a host computer device. In another example, data stored in a certain data-storage device, which is supposed to be encrypted, can be compressed.

Following compression of the data, the compression ratio between the original data before compression and the compressed data is calculated; e.g. by encryption manager 319 (block 603). The calculated compression ratio is then compared to an expected compression ratio; e.g. by encryption manager 319 (block 605).

As explained above, the expected compression ratio can be calculated based on historical compression of data (e.g. data received from a certain host computer device). The same principles described above with reference to FIG. 4 are implemented herein. However, opposite than in malware detection, here, properly encrypted data, which also compressed, would generate a lower compression ratio (data size before compression divided by the size of the same data after compression) than none encrypted data, which is also not compressed.

Based on the different between the between the compression ratio and the expected compression ratio it is determined whether the data is likely to be properly encrypted or is suspected of not being properly encrypted. If the difference (represented for example by the arithmetic difference or the ratio or any other mathematical relationship between the two ratio values) between the compression ratio and the expected compression ratio is greater than a certain predefined threshold value this may indicate that the received data is not properly encrypted and an encryption failure notification can be is issued (block 609). As described with reference to FIG. 4 warnings can be generated and displayed and possible also transmitted to the source host computer device.

The term "non-transitory" is used herein to exclude transitory, propagating signals, but to otherwise include any volatile or non-volatile computer memory technology suitable to the application.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A computer system comprising:
a computing device and at least one data-storage device constituting a physical storage space; the computing device is operatively connected to at least one host computer device comprising a respective computer data-storage device, wherein data received at the computing device from the at least one computer host device is stored in the physical storage space; the computing device comprises a processing circuitry configured to detect malicious software on the at least one host computer device, wherein the malicious software, when being executed operates to encrypt data stored on the respective computer data-storage device; the processing circuitry is configured for detecting the malicious software to:
compress data received from a host computer device to obtain compressed data;
determine compression ratio value between data as originally received from the host computer device, before compression by the processing circuitry, and the compressed data generated by the processing circuitry;

generate a malware infection notification in case the difference between an expected compression ratio value of the host computer device and the compression ratio value is greater than a certain threshold value assigned to the host computer device;

wherein the computer system is configured to execute a learning process for determining the expected compression ratio value of the host computer device, comprising:

for each one of multiple write commands received from the host computer device:

compress data received in the write command intended to be written in the computer data-storage device, to obtain compressed data; determine a compression ratio value to thereby obtain a plurality of compression ratio values;

calculate an expected compression ratio value of the host computer device based on the plurality of compression ratio values determined for the data of each one of the multiple write commands; and repeatedly calculate the compression ratio and update the threshold according to changes in the calculated compression ratio; and avoid storing data received from the host computer device in the physical storage space in the event that the malware infection notification is generated.

2. The computer system of claim 1 is further configured, responsive to malware infection notification, to execute a protective operation for protecting part or all of the data stored on the physical computer storage space.

3. The computer system of claim 2 wherein the protective operation includes generating instructions to stop further data transfer from the host computer storage device.

4. The computer system of claim 2 wherein the protective operation includes generating instructions to execute a backup snapshot of part or all of the physical storage space.

5. The computer system of claim 2 wherein the protective operation includes generating instructions to override a scheduled delete operation on a previous snapshot backing up data stored in the physical storage space.

6. The computer system of claim 1 is further configured, responsive to malware infection notification, to execute a malware infection warning.

7. The computer system of claim 6 wherein the malware infection warning is transmitted to the host computer device.

8. The computer system of claim 6 wherein the warning includes a graphical indication displayed on a computer display of the computer system and/or the host computer device.

9. The computer system of claim 1 is a data-storage system comprising a control layer comprising a plurality of computing devices and plurality of data-storage devices, the data-storage devices constituting the physical storage space of the data-storage system.

10. A computer-implemented method of detecting malicious software, wherein the malicious software, when being executed by a computer operates to encrypt data stored on a computer data-storage device, the computer data-storage device constituting a physical storage space, the computer connected to at least one host computer device and configured to store data received from the at least one computer host device in the physical storage space; the method comprising:

compressing data received from the host computer device to obtain compressed data;

determining compression ratio value between data as originally received from the host computer device, before the compression after the data is received, and the compressed data after the compression;

generating a malware infection notification in case the difference between an expected compression ratio value of the host computer device and the compression ratio value is greater than a certain threshold value assigned to the host computer device;

executing a learning process for determining the expected compression ratio value comprising:

for each one of multiple write commands received from a certain host computer device:

compressing data received in the write command intended to be written in the computer data-storage device, to obtain compressed data; and determine a compression ratio value to thereby obtain a plurality of compression ratio values;

calculating an expected compression ratio value of the host computer device based on the plurality of compression ratio values determined for the data of each one of the multiple write commands; and repeatedly calculating the compression ratio and updating the threshold according to changes in the calculated compression ratio; and avoiding storing data received from the host computer device in the physical storage space in the event that the malware infection notification is generated.

11. The computer-implemented method of claim 10 further comprising, responsive to malware infection notification, executing a protective operation for protecting part or all of the physical stored on the computer storage space.

12. The computer-implemented method of claim 11 wherein the protective operation includes generating instructions to stop further data transfer from the host computer storage device.

13. The computer-implemented method of claim 11 wherein the protective operation includes generating instructions to execute a backup snapshot of the physical storage space or part thereof.

14. The computer-implemented method of claim 11 wherein the protective operation includes generating instructions to override a scheduled delete operation on a previous snapshot backing up data stored in the physical storage space or part thereof.

15. The computer-implemented method of claim 10 further comprising, responsive to malware infection notification, executing a malware infection warning.

16. The computer-implemented method of claim 15 further comprising transmitting the malware infection warning to the host computer device.

17. The computer-implemented method of claim 15 wherein the warning includes a graphical indication displayed on a computer display of the computer system and/or the host computer device.

18. A non-transitory program storage device readable by a computer, tangibly embodying computer readable instructions executable by the computer to perform a computer implemented method of detecting malicious software, wherein the malicious software, when being executed operates to encrypt data stored on a computer data-storage device; the computer data-storage device constitutes a physical storage space; and the computer is connected to at least one host computer device and configured to store data received from the at least one computer host device in the physical storage space; the method comprising:

compressing data received from a host computer device to obtain compressed data;

determining compression ratio value between data as originally received from the host computer device, before the compression after the data is received, and the compressed data after the compression;

generating a malware infection notification in case the difference between an expected compression ratio value of the host computer device and the compression ratio value is greater than a certain threshold value assigned to the host computer device;

executing a learning process for determining the expected compression ratio value comprising:

for each one of multiple write commands received from a certain host computer device:

compressing data received in the write command intended to be written in the computer data-storage device, to obtain compressed data; and determine a compression ratio value to thereby obtain a plurality of compression ratio values;

calculating an expected compression ratio value of the host computer device based on the plurality of compression ratio values determined for the data of each one of the multiple write commands; and repeatedly calculating the compression ratio and updating the threshold according to changes in the calculated compression ratio; and avoiding storing data received from the host computer device in the physical storage space in the event that the malware infection notification is generated.

* * * * *

UNITED STATES PATENT AND TRADEMARK OFFICE
CERTIFICATE OF CORRECTION

PATENT NO.        : 10,735,462 B2
APPLICATION NO.   : 15/366315
DATED             : August 4, 2020
INVENTOR(S)       : Ran Sheri and Yogev Vaknin Page 1 of 1

It is certified that error appears in the above-identified patent and that said Letters Patent is hereby corrected as shown below:

In the Claims

Column 12, Lines 28-31, Claim 11, should be changed to:
-- 11. The computer-implemented method of claim 10 further comprising, responsive to malware infection notification, executing a protective operation for protecting part or all of the data stored on the physical storage space. --

Signed and Sealed this
Fifteenth Day of December, 2020

Andrei Iancu
*Director of the United States Patent and Trademark Office*